United States Patent [19]

Wu

[11] Patent Number: 5,248,425
[45] Date of Patent: Sep. 28, 1993

[54] AQUEOUS THERMITE COATED FILTER

[75] Inventor: Shy-Hsien Wu, Horseheads, N.Y.

[73] Assignee: Corning Incorporated, Corning, N.Y.

[21] Appl. No.: 967,789

[22] Filed: Oct. 28, 1992

[51] Int. Cl.$^5$ ............................................. B01D 39/20
[52] U.S. Cl. .................................... 210/639; 210/644;
  210/653; 210/500.25; 210/500.26; 210/510.1;
  264/44; 264/DIG. 48; 264/DIG. 62
[58] Field of Search ...................... 210/510.1, 634, 639,
  210/644, 506, 649-653, 500.25, 500.26, 509,
  510.1; 501/89, 127; 266/227; 264/41-44, 45.1,
  56, DIG. 48, DIG. 62

[56] References Cited

U.S. PATENT DOCUMENTS

| | | |
|---|---|---|
| 3,893,917 | 7/1975 | Pryor . |
| 4,258,099 | 3/1981 | Narumiya . |
| 4,591,383 | 5/1986 | McGarry . |
| 4,772,395 | 9/1988 | Tungatt . |
| 5,022,991 | 6/1991 | Day . |
| 5,104,540 | 4/1992 | Day et al. ........................ 210/510.1 |

Primary Examiner—Frank Sever
Attorney, Agent, or Firm—Angela N. Nwaneri

[57] ABSTRACT

This invention relates to an improved thermite coated molten metal filter. According to the invention, a molten metal filter is coated with an aqueous thermite coating slurry containing oleic acid, water-miscible surfactants, water-soluble binders, and water-soluble dispersants.

18 Claims, No Drawings

AQUEOUS THERMITE COATED FILTER

BACKGROUND

The present invention relates to improved thermite coated molten metal filters and the method of making them. It also relates to aqueous thermite coating slurries applied to molten metal filters, to improve the performance, and increase the durability of such filters, in particular, in applications involving molten steel.

In processing molten metals, reduced metals are heated to temperatures above their melting points and then poured into castings either for purposes of storage or for molding. Typically, the molten metal is poured through a ceramic filter to entrap any inclusions which may be present in the molten metal. In most cases, the molten metal temperature is at levels approaching the functional limits of the ceramic filters. In addition, the filter is subject to chemical corrosion which may lead to structural weakening of the filter. Most of the inclusions filtered out of the molten metal are oxide based impurities, and it has been found that the filter efficiency is optimal when the surface energy of the ceramic filter matches, as close as possible, that of the oxide based impurities.

It has also been found that some of the problems encountered in filtering molten metals are caused by the freezing of the metal as it contacts the filter. Since the filter is at a temperature significantly less than the molten metal temperature, the initial molten metal which contacts the filter must impart heat to the filter. Since the filter draws heat from the metal, the part of the molten metal in contact with the filter, decreases in temperature sometimes causing the metal to freeze in the filter. As the metal solidifies in the filter, the solid metal blocks the filter and inhibits the filter performance.

Another problem commonly encountered with molten metal filters, particularly filters formed with aqueous based slurries, is the tendency of the alloys of Fe/Al and Cr/Al, to react vigorously with water to generate hydrogen gas (bubbles) in the slurry solution. The hydrogen evolution continues over long periods of time leading to a steady increase in the pH, and degradation of the slurry with time.

A more severe problem encountered with molten metal filters is "gassing" which is a function of the type and amount of organic compounds present in a thermite coating slurry. During the filtering process and while the molten metal is being poured through a coated filter, organic ingredients in the coating tend to burn off rapidly to generate gas which rushes through the filter and molten metal pour. The presence of such gaseous impurities affects the quality of the final cast product after the molten metal is solidified. If such gassing is too severe, flying metal pieces will appear and the coating may crack or separate from the substrate. In more severe cases, the filter may split apart resulting in a catastrophic failure. The above problems of hydrogen formation and gassing remain major concerns with aqueous coating formulations.

Several methods have been suggested for removing gaseous impurities. One such method is degassing, a process which involves injecting a fluxing gas into the molten metal. There are several major drawbacks associated with such methods including the need to provide large multiple chamber arrangements necessary to sufficiently treat large quantities of molten metal batches. In addition, large pressure drops have been observed in using such systems.

Few devices and methods have been suggested for dealing with the many problems associated with molten metal filters. One improved molten metal filter which addresses many of the above problems including the problems associated with freezing is disclosed in U.S. Pat. No. 5,022,991, titled THERMITE COATED FILTERS, issued to Day et al., assigned to the assignee of the present invention, and herein incorporated by reference. The reference discloses the application of a thermite coating onto a molten metal filter surface to avoid freezing during the filtering process.

While the thermite coated molten metal filter of Day et al., offers significant improvements over the molten metal filters of the prior art, a number of problems still exist. A typical thermite coating system consists of five key ingredients namely: $Fe_2O_3$, alloys of Fe/Al or Cr/Al, graphite, organic binder, and solvent. The presence of a toxic and flammable solvent in this system poses both health and environmental hazards, particularly in a production environment involving a large scale operation utilizing a substantial amount of highly volatile solvents. Cost is also a concern due to the use of relatively expensive organic binders and solvents and the need to safely dispose of the spent solvents.

Accordingly, it is a principal objective of the present invention to provide an improved thermite coated molten metal filter, more specifically, an aqueous thermite coated molten metal filter, particularly suitable for the filtration of molten iron without the problems discussed above.

SUMMARY OF THE INVENTION

Briefly, the present invention provides a stable, aqueous thermite coated molten metal filter having formed thereon, an aqueous thermite coating slurry comprising (1) metal, metal oxide and graphite powders, (2) water, (3) oleic acid, (4) water-miscible surfactant, (5) dispersant, and (6) water-soluble binder.

In one aspect, the present invention provides an improved thermite coating slurry in which the organic solvent-soluble binder of the prior art is replaced with a water-soluble binder.

In another aspect, the metal alloy powder is protected against reaction with water by coating the powders with oleic acid.

In another aspect, the present invention relates to a solvent-free thermite coated molten metal filter.

In still another aspect, the present invention relates to a method of producing a durable, molten metal filter which will minimize gas formation during (1) slurry formation, and (2) the molten metal pour operation.

As used in this specification:

the term "thermite" refers to exothermic reactions, particularly reactions involving an oxidation/reduction reaction between a metal oxide and an active metal;

the term "thermite solids or material" refers to a highly reactive combination of an oxidizer and oxidant, generally a metal oxide, with a more aggressive reduced metal, which when a small amount of heat is added, triggers a highly exothermic reaction to produce a tremendous amount of heat. Thermite materials are inherently completely different from ceramic-type materials or ceramic precursors in that the thermite material, once triggered, engages in a self-sustaining exothermic reaction which generates a very large amount of heat, while the typical ceramic-forming oxides are generally heat consuming, in their role and therefore, take considerable heat to increase their temperature rather than giving off heat during reaction or formation. Accordingly, ceramic material can not be described as thermite material since ceramic forming materials are not heat producing or metal reducing. When thermite material is coated on a ceramic material such as a ceramic molten metal filter, the metal oxide produced by the thermite reaction will generally attach to the underlying ceramic substrate. The tremendous heat generated by such a thermite-coated ceramic material heats the ceramic material and super heats any material which may be present in the general area and thus, prevents freezing of filtering molten mass;

the term "thermite process" involves the mixing of a reducible metal oxide (e.g., $Fe_2O_3$) with an easily oxidized metal (e.g., Al or Si), (collectively, thermite material), to produce a molten metal (e.g., Fe) formed through the reduction of the reducible oxide, and a new metal oxide (e.g., $Al_2O_3$) which is formed through apparent transfer of the oxygen atoms to the easily oxidized metal. The metal/metal oxide mixture triggers a tremendously exothermic reaction. The main advantage of the thermite process is that a small amount of heating of the thermite material triggers a tremendously exothermic reaction wherein the metal oxide is reduced to molten metal, and the metal is oxidized to form metal oxide. This type of reaction is strongly exothermic and produces a tremendous amount of heat which super heats the area surrounding the thermite mixture. More importantly, such reactions are triggered by the addition of a relatively small amount of heat, and the heat gained from the resulting thermite process far exceeds, by orders of magnitude, the initial addition of heat to the system. Thermite reactions can also occur between reduced metals and non-oxide metal compounds such as $B_4C$ or $SiC$, when mixed with Al, Ti, Nb or Cr. Such mixtures will reduce the initial carbide and oxidize the starting metal through formation of a new metal carbide accompanied by the release of a tremendous amount of heat; the term "gassing" refers to the generation of gas while molten metal is being poured through a molten metal filter; and the term "priming temperature" refers to the minimun temperature at which a highly exothermic reaction can be triggered in the thermite material.

DETAILED DESCRIPTION OF THE INVENTION

The molten metal filter of the present invention is produced by coating a molten metal filter with an aqueous thermite coating slurry containing Cr/Al or Fe/Al alloy, $Fe_2O_3$ powders, and/or graphite, water, oleic acid, water-miscible surfactant, water-soluble dispersant, and a non-solvent soluble (water-soluble) organic binder.

I have discovered that a highly stable aqueous thermite coated molten metal filter, that is, a molten metal filter which will not generate hydrogen gas during the coating operation or on standing, and which will minimize gassing, can be formed by coating the reactive metal powders of a thermite slurry (i.e., the thermite material), with a barrier coating of oleic acid. The high stability of the aqueous thermite coating of the invention is due to the discovery that oleic acid is effective in protecting metal and metal alloy powders from reaction with water. This protection in the short term, eliminates hydrogen generation during the slurry coating operation to provide a stable slurry. In the long term (i.e., on standing), the oleic acid also protects the alloys in coated substrates (molten metal filters), by keeping the alloy powders intact in the coated substrate during storage over a long period of time to enhance the shelf life of the molten metal filters.

Both reagent grade oleic acid such as A195-500, available from Fisher Chemical, and commercial grade oleic acid such as Emersol ® 213 (with purity of about 80%, available from Emery), have been found to be useful for the practice of the invention.

The amount of oleic acid should be any amount necessary to coat the reactive metal powders, but not so much as to leave excess oleic acid, to avoid the difficult separation step that may be required to remove the excess acid. As shown in the examples, the amount of oleic acid needed to adequately coat the powders will also depend on the method employed to mix the acid with the powders. For example, if hand mixing is employed, significantly more oleic acid will be required to coat a given amount of powders than would be required using a machine such as the Littleford mixer, due to the high shear generated by the latter. The latter provides a more efficient coating both in terms of adhesion and the amount of oleic acid molecules adsorbed by the powders. It is also expected that the Littleford will provide a more uniform, and thinner layer of oleic acid than can be achieved by hand mixing. Therefore, the more shear is generated during the mixing operation, the less oleic acid will be required to coat the powders.

For best results, a coating weight of less than 30% oleic acid based on powders is preferred. More preferably, the amount of oleic acid should be in the range of 0.5 to 25 weight percent acid based on powders. As stated above, the actual amount of oleic acid required will depend on the efficiency of the mixing method applied, the nature and surface area of the powders. For example, I have found that for Fe/Al powders, using a Littleford mixer, the amount of oleic acid can range from 0.5 to 8%, preferably 1.5-8%. However, when the Littleford mixer was replaced by hand mixing, the amount of oleic acid needed to adequately coat the Fe/Al powders was increased to about 11%. Similarly, when hand mixing was used, it required 15 to 20% oleic acid to coat Cr/Al powders.

There are at least two aspects of oleic acid protection to alloy powders against reaction with water. In the short term, this protection eliminates the hydrogen generation to allow or provide a stable slurry which may be coated on a filter. This is referred to as the immediate or short term stability of the slurry. In the long term, the oleic acid protects and keeps the alloys intact either in the slurry or in a coated substrate or filter when stored under ambient conditions for a prolonged period of time, thereby enhancing the shelf life of the slurry and/or of the coated substrate. Thus, the aqueous slurry of the invention can be optimized with respect to (1) slurry properties as measured by (a) immediate coatability, or (b) shelf life or slurry stability with age, and (2) coating performance as measured by (a) freshly coated filter, and (b) shelf life of a coated filter.

I have found that for freshly coated Fe/Al powders for example, the oleic acid concentration can be as low as 0.5% and still remain stable in water. Without intending to be bound by theory, it is believed that the acid concentration necessary to adequately protect the powders in a final formulation for long standing periods will be higher. The actual acid concentration will depend on the length of storage or standing (i.e., shelf-life) required, and other formulation parameters such as solids, surfactant and dispersant levels.

I have also discovered that after the powders have been treated with acid, they are no longer wettable with water and therefore, will not disperse uniformly in an aqueous mixture. To restore the wettability of the powders and uniformly redisperse these powders after they have been coated with acid, dispersants and surfactants may be used. Certain dispersants and surfactants have been found to be very effective.

Preferred surfactants of the invention generally comprise organic molecules with both hydrophobic and hydrophilic functionalities to allow full wetting of the coated powders by the dispersion medium. Generally, the surface activity of nonionic surfactants is determined by the Hydrophile-Lipophile Balance (HLB) values of the surfactants, calculated by dividing the weight percent of ethylene oxide in the surfactant molecule by 5 with the scale of measurement ranging from 0, for completely lipophilic or hydrophobic, to 20, for completely hydrophilic or lipophobic. For the invention, surfactants having HLB values of at least 10 are preferred, more preferably, at least 13. One such product, Triton® X-100, an alkenylphenyl polyether alcohol having a HLB value of 13.5 (supplied by Union Carbide), has been found to be very effective for the uniform redispersion of oleic acid-coated alloy powders in water.

The dispersing agent preferably comprises organic molecules having at least an anchoring group and a dispersing functionality to aid in dispersion of the powders. Salts of polymeric carboxylic acids, particularly sodium salts of such acids, have been found to be useful dispersants for the invention. It is believed that ammonium salts of polymeric carboxylic acids may also be useful for the practice of the invention. One particularly useful dispersing agent for this invention is Tamol® 731, a proprietary water soluble sodium salt of a polymeric carboxylic acid, supplied by Rohm & Haas. Tamol® 731 has been found to be very effective in re-dispersing $Fe_2O_3$ and graphite powders in aqueous medium.

The amount of surfactant needed to redisperse the oleic acid-coated powders will vary depending on the particular powders used. However, the amount of surfactant should not be so high as to cause the slurry viscosity to rise on long standing. For example, 4-5% Triton® X-100 (based on alloy) was established as being optimal for the alloy powders discussed above. For the ferrous oxide and graphite powders, the amount of Tamol® 731 was maintained at about 1% based on $Fe_2O_3$ to avoid large viscosity increase upon standing. The slurry of the invention is exemplified by a composition having up to 50% solids (i.e., thermite material and graphite) consisting of 35% metal alloy, 30% carbon (graphite) and 35% $Fe_2O_3$; water; 5% binder solution in water; 5% water-miscible surfactant based on the alloy; 1% water-soluble dispersant based on the $Fe_2O_3$; and 0.5 to 30% oleic acid based on alloy.

In one particularly useful example, a 48% solids, aqueous thermite slurry having a low viscosity and good bonding was prepared by providing a thermite solid system comprising 35% Cr/Al alloy, 30% carbon or graphite, and 35% $Fe_2O_3$; treating the Cr/Al alloy with 20% of oleic acid; mixing 20.16 g of the acid-treated alloy with 47.13 g of 5% Airvol 205® solution in a bottle containing alumina balls; adding 0.84 g of Triton X-100 to the mixture; adding 14.4 g of graphite powders; adding 0.67 g of Tamol 731 solution (25% concentration to make 1% based on Fe2O3); and finally, adding 16.8 g of Fe2O3.

The slurry is prepared by first adding the surfactant to the binder solution and stirring for a few minutes, followed by the addition, in order, of oleic acid-treated alloy powders and carbon, dispersant solution, and finally the $Fe_2O_3$, with some stirring after each addition. For best results, the mixture can be rolled for several minutes after each powder addition to ensure thorough mixing.

The oleic acid coating treatment is accomplished by mixing just the right amount of oleic acid with the powders of metal or metal alloy to coat the powders with oleic acid. The oleic acid is added to prevent the reactive metal or metal alloy powders from generating hydrogen in the slurry.

Useful binders for the thermite solution of the invention include low molecular weight water-soluble binders such as Airvol® 205, a low molecular weight polyvinyl alcohol (MW 31,000-50,000) available from Air Products, Allentown, Pa., which has been found to yield high solids slip and which provides good bonding of the aqueous thermite coating on cellular substrates such as cellular ceramic molten metal filters. Other water-soluble binders which may be used for the present invention include Airvol® 350 (MW 124,000-186,000) also available from Air Products, PVP K-60® (MW 160,000), and PVP K-30® (MW 40,000), both polyvinylpyrrolidones available from GAF, Linden, N.J. I have found low molecular weight (20,000-80,000) polyvinyl alcohol for example, Airvol® 205, to be particularly useful for the practice of the invention.

The molten metal filter substrate can be made from alumina, mullite, zircon, zirconia, spinel, cordierite, lithium, aluminosilicates, titania, feldspars, quartz, fused silica, silicon carbide, kaolin clay, aluminum titanate, silicates, aluminates, and mixtures thereof. As disclosed in U.S. Pat. No. 5,022,991, it has been found advantageous to select mixtures of mullite and alumina as substrate filter material. When excess alumina is added to a mullite batch composition and fired at approximately 1400° C., it is found to produce a ceramic body comprised of mullite and alumina crystalline phase, and these structures can withstand the typical pouring temperatures of molten low carbon steel, in excess of approximately 2800° F. (1537° C.). A small glassy phase may also be present in the mullite-alumina ceramic body which may aid the thermal shock properties of the ceramic. The glass, comprising an alkali alumino-silicate composition, may occupy grain body sites between the different phases. The glass relieves thermal stresses caused by rapid heating without disruption of the mullite or alumina crystalline phases.

In one particularly useful embodiment, the substrate of the molten metal filter is comprised of a mullite-alumina composition with the bulk chemistry of the powder ranging from 72 to 86 weight percent alumina, the remaining balance being silica. Various impurities may be present in the raw materials, such as alkaline earths, without serious impact on the resultant body. Upon sintering, the crystal phases present are 20-45% by weight alumina, 55-80% by weight mullite, 0-2% cristobalite, and a 0-10% amorphous phase. A more preferred substrate bulk composition consists essentially of 72 to 82 weight percent alumina, the remaining being silica. The mixture is processed as described above and sintered at approximately 1400° C. The most preferred substrate bulk (composition consists essentially of 75-78 weight percent alumina, the remainder being silica.

The molten metal filter of the invention is produced by applying the aqueous thermite slurry of the invention onto a substrate. The coating can be accomplished by any known technique such as by dipping, immersion, spraying, pouring or other suitable methods with the object being to adequately coat the substrate with a uniform, layer of the slurry which is well bonded to the substrate.

When molten metal is poured through a filter, organic ingredients in the coating will burn off rapidly to generate gas (gassing) which rushes through the filter and molten mass. If such gassing is too severe, in the case of a coated filter, the coating may crack or separate from the substrate resulting in coating failure. In more severe cases, the filter may split apart resulting in total or catastrophic failure. The degree of gassing observed is governed by the nature and amount of organic compounds used in the coating. For the present aqueous slurry system, only a very minor degree of gassing is observed at the very beginning of pouring. As the pouring progresses, no gassing is observed. More significantly, this minor gassing at the onset of pouring did not result in any adverse effects on the performance of the coated filters of the invention.

The ceramic body may be conveniently formed into various shapes and configurations. For example, it can be extruded into a cellular monolith with a honeycomb configuration, sintered and then coated with the aqueous thermite coating slurry of the present invention. Preferably, the substrate is a porous body such as a honeycomb structure having a plurality of thin walls defining a plurality of open ended cells extending therethrough. The substrate can also be a ceramic foam material having an open cell structure characterized by a plurality of interconnected voids surrounded by a web of the ceramic.

EXAMPLES

Thermite Materials

The following examples were carried out using three types of metal and metal alloy powders namely: (1) Mepico Red ® 567 (fine, red ferric oxide powders available from Columbia Chemical Corp.), (2) −325 mesh Fe/Al alloy powders, and −400 mesh Cr/Al alloy powders (both alloys available from Shieldalloy, and (3) GPF graphite (available from Dixon).

1. Small Batch Experiments
a) Slurry Preparation

The slurries were prepared by adding the ingredients in a 125 cc plastic bottle containing 20 aluminum grinding balls (½ inch size). A surfactant, Triton ® X-100, was added to an aqueous binder solution, Airvol ® 205, in the bottle followed by the addition of oleic acid treated thermite solids. Once the acid-treated powders were wetted with the surfactant, the bottle was rolled for about 15 minutes. Graphite powders were then added and the bottle, wetted and rolled for an additional 15 minutes. Finally, a dispersant, Tamol ® 731, and ferric oxide powders were added, wetted and rolled for another 15 minutes. I have found that excessive amounts of either Triton ® X-100 or Tamol ® 731 will cause the slurry viscosity to increase on standing. Such increases in slurry viscosity have been observed for example, in batches containing 10% of Triton ® X-100 based on alloy and/or 3% of Tamol ® 731 based on ferric oxide.

b) Slurry Evaluation/Results

Films of the slurries were cast on slides, dried and evaluated for the presence of air bubbles, uniformity, flow or ease of coating, and bonding strength.

Coatings of the aqueous thermite slurries of the invention were smooth/uniform and showed good bonding strength. The slurries were stable as measured by pH, viscosity and hydrogen gas generation over long periods of time. In one embodiment, only insignificant amounts of hydrogen, were observed after a standing period of more than thirty days.

2. Large Scale Experiments
a) Slurry Preparation

In the following examples (Runs), large slurry batches, typically 1000 to 2000 g in size were prepared in 2 or 4 liter containers with 2261 or 4522 g mixing balls respectively. The solids composition was generally in the ratio of alloy/graphite/iron oxide of 35/30/35, with the exception of Runs 6 and beyond in which the ratio was 35.28/30/34.72%.

i) Cr/Al Slurries

| Slurry Composition | Run # 1 | Run # 2 | Run # 3 |
|---|---|---|---|
| Solids Content | 48% | 45% | 45% |
| Size (gr) | 1000 | 1000 | 2000 |
| ¹Airvol ® 205 (% conc./amount, g) | 5/471.3 | 5/504.3 | 5/1024.4 |
| ²Triton ® X-100 (g) | 8.4 | 7.9 | 15.8 |
| Cr/Al (mesh) | (−400) | (−400) | (−400) |
| ³Oleic acid-treated alloy (%/amount, g) | 20/201.6 | 20/189 | 15/362.2 |
| Carbon (g) | 144 | 135 | 270 |
| Tamol ® 731 solution (g) | 6.7 | 6.3 | 12.6 |
| $Fe_2O_3$ (g) | 168 | 157.5 | 315 |

¹The binder values indicate both the concentration, and the amount of the binder solution added to the batch. For example, 5/471.3 implies 471.3 grams of a 5% solution.
²Unless indicated otherwise, Triton ® X-100 was used at a 5% level based on alloy for all runs.
³The oleic acid treated alloy values are also given in two parts- the first indicating the amount of oleic acid (%) based on the alloy with which the alloy was treated. The second value indicates the amount of the oleic acid treated alloy added to the batch.

ii) Fe/Al Slurries: The following experiments were run using Fe/Al alloy powders which are more active, but cheaper than the Cr/Al alloy powders used in Runs 1-3 above. The formulation cost of the Fe/Al alloy slurries is estimated to be in the order of 20 to 40% lower than the cost of a comparable solvent-based slurry of the prior art which uses nitrocellulose binders. For example, the estimated cost of the slurry of Run #5 is $2.78/kg, which translates to a savings of 23-35% of the cost of a comparable solvent-based system.

| Slurry Composition | Run # 4 | Run # 5 | Run # 6 | Run # 7 |
|---|---|---|---|---|
| Solids Content | 45% | 48% | 46.5% | 47% |
| Size (g) | 1500 | 1500 | 1500 | 1500 |
| ¹Airvol ® 205 | 5/777.75 | 5/729.6 | 5/768.15 | 5/752.8 |

-continued

| (% conc./amount, g) | | | | |
|---|---|---|---|---|
| [2]Triton ® X-100 (g) (%/amount, g) | 5/11.85 | 5/12.6 | 5/12.3 | 5/12.45 |
| Fe/Al (mesh) | (−325) | (−200) | (−325) | (−325) |
| [3]Oleic acid-treated alloy (%/amount, g) | 11/262.2 | 11/279.75 | 5/258.45 | 8/268.65 |
| Carbon (g) | 202.5 | 216 | 209.25 | 211.5 |
| Tamol ® 731 solution (g) | 9.45 | 10.05 | 9.75 | 9.75 |
| $Fe_2O_3$ (g) | 236.25 | 252 | 242.1 | 244.8 |

| Slurry Composition | Run # | | | | |
|---|---|---|---|---|---|
| | 8 | 9 | 10 | 11 | 12 |
| Solids Content (%) | 48 | 47 | 47 | 47 | 47 |
| Amount (g) | 1500 | 1500 | 1500 | 1500 | 1500 |
| [1]Airvol ® 205 (% conc./amount, g) | 1.5/758.55 | 3/772.8 | 3/765.3 | 5/765.3 | 5/767.85 |
| [2]Triton ® X-100 (%/amount, g) | 3/7.65 | 2/4.95 | 5/12.45 | 5/12.45 | 4/9.9 |
| Fe/Al (mesh) | (−325) | (−325) | (−325) | (−325) | (−325) |
| [3]OA-treated alloy (%/amount, g) | 1.5/257.7 | 3/256.2 | 3/256.2 | 3/256.2 | 3/256.2 |
| Carbon (g) | 216 | 211.5 | 211.5 | 211.5 | 211.5 |
| Tamol ® 731 solution (g) | 10.05 | 9.75 | 9.75 | 9.75 | 9.75 |
| $Fe_2O_3$ (g) | 250.05 | 244.8 | 244.8 | 244.8 | 244.8 |

[1]Values indicate both the concentration, and the amount of the binder solution added to the batch. For example, 5/471.3 implies 471.3 grams of a 5% solution.
[2]Values are given in both the concentrations of the solution, and the amount added to the slurry - the first indicating the amount of Triton X-100 (%) based on alloy, and the second value indicating the amount of the Triton X-100-treated alloy added to the batch.
[3]The oleic acid treated alloy values are also given in two parts- the first indicating the amount of oleic acid (%) based on the alloy with which the alloy was treated. The second value indicates the amount of the oleic acid-treated alloy added to the batch.

b) Slurry Evaluation/Results

Honeycomb substrates measuring 2.1 or 2.8 in[2] by 0.5 in deep and 100 cpsi with 17-22 mil wall thickness, were dipped in one of the above large scale thermite slurries (i.e., Runs 1-12). Any excess fluid was blown off using high air pressure. The coated substrates were then dried in a 120°-150° C. oven for a period of about 30-60 minutes. The dried coatings were observed to be smooth and uniform with a coating weight in the range of 30 to 40%. In addition, the coatings had good bonding strength to the substrate.

To evaluate the filter performance of the coated substrate, low carbon, molten steel (about 0.2% carbon), was poured through the substrates and evaluated in terms of priming temperature, gassing and filtering efficiency. The results are summarized below.

Run #1

The slurry showed no hydrogen evolution and did not settle during the substrate coating operation with occasional gentle stirring with a spatula. Finally, the thermite coated molten metal filters of the present invention displayed very long cell blow out times.

The fresh slurry had an initial pH of 5.45. After standing overnight, no gas bubbles were observed and the slurry could be restirred easily with a spatula to regain its uniformity and viscosity with a slight increase in pH to about 5.65. After 17 days the pH rose to about 5.9 with only a few bubbles appearing after the slurry was stirred with a spatula. After 74 days no bubbles were observed and the pH had risen to 7.15. At the end of 117 days, the slurry was still stable with a pH of 6.85 and no bubbles were observed. The coated substrates were very smooth, uniform and strongly bonded.

Run #2

Uniform, hydrogen-free slurry with a pH of 5.7 and a lower viscosity than Run #1 due to the lower solids content. Some bubbles started to appear on the 20th day with the pH rising only slightly to about 5.75. No bubbles were observed on the 72nd day but the pH had risen to 7.1. However, the low viscosity remained nearly unchanged throughout the 113 days of observation. The pH on the 113th day was 6.85.

The coated substrates were very smooth, uniform and strongly bonded. The metal pouring test was successful with a relatively quiet pouring (i.e., only a minor extent of gassing at the very beginning of the pour). In addition, low priming temperatures were observed with no loss of coating or cracking.

Run #3

The slurry viscosity was slightly lower than Run #2 with a pH of 5.4. Some bubbles appeared on the 12th day with the pH rising to 6.1. On the 56th day, no bubbles were observed but the pH had risen to 7.15. The viscosity remained low and nearly unchanged by the 97th day and the pH fell to 6.8. Coated substrates performed similar to Run #2 during the molten metal pouring test.

Run #4

Uniform, hydrogen-free slurry. Some bubbles appeared on the 7th day with a pH of 5.9. By the 38th day, viscosity remained low with a pH of 7.0.

Like the earlier runs, this experiment produced a smooth, uniform film which was strongly bonded to the substrates. Low priming temperatures were observed with only a minor degree of gassing at the beginning of the molten metal pour test.

Run #5

This run was as successful as Run #4. No bubbles were observed for 14 days (pH 5.9), and the slurry maintained a low viscosity for 38 days with pH rising to 7.35. The result of the molten metal pour test was similar to Run #4.

c) Coatability

For the following set of examples, the scale-up experiments were aimed at reducing the total organic content of the slurries without sacrificing the coatability or quality of the coating, including the degree of bonding to the substrate.

In Run #6 and all subsequent runs, the reagent grade oleic acid of the prior examples was replaced with cheaper, commercial grade oleic acid which proved to be about as effective as the reagent grade.

All runs yielded uniform, fluid slurries with good stabilities. No problems attributable to hydrogen evolution were observed even with oleic acid levels as low as 1.5% (Run #8). Run #6

In addition to the difference in oleic acid grade, in this run, the oleic acid treatment of the alloy powders was accomplished using a Littleford mixer rather than hand mixing as was the case with the earlier runs. As expected, the high shear of the Littleford mixer provides a more effective coating of oleic acid over the alloy powders, both in terms of better adhesion and in the amount of oleic acid adsorbed. It is theorized that using this method, a much thinner and more complete layer of oleic acid can be coated on the powders than with hand mixing which will result in non-uniform and thick oleic acid layers. As a result, the amount of oleic acid required to coat the powders is significantly reduced (from 11% for hand mixing, to 5%).

The initial pH of this slurry was 5.75. Some bubbles were observed around the 20th day (pH 6.6) and the slurry maintained its low viscosity for more than 30 days with the pH rising to 6.85. This experiment shows that an oleic acid level as low as 5% can be effective in protecting alloy powders from reaction with water.

Run #7

As successful as Run #6. Some bubbles were observed around the 20th day (pH 6.4) and the slurry maintained its low viscosity for more than 30 days (pH 7.2). Smooth coated substrates with well bonded films were obtained.

Run #8-12

As stated above, these runs yielded uniform, fluid slurries with good stabilities. No hydrogen evolution was observed even at the very low (1.5%) oleic acid level of Run #8. However, coatability was relatively poor in Run #8 perhaps due to the significantly low organic content (1.5% oleic acid (OA), 1.5% polyvinyl alcohol (PVA), and 3% Triton ® X-100). It became increasingly difficult to blow off the excess slurry from the coated (dipped) samples, resulting in blocked cells and heavy coating pickup. As the respective amounts of OA and PVA were increased to 3% in Run #9, it became relatively easier to clean off excess slurry from the coated samples. The ease of clean off increased further as the organic content was again raised in Run #10 by increasing the level of Triton ® X-100 from 2% in Run #9 to 5% in Run #10. However, on standing, some of the cells would again become blocked.

The most preferred embodiments of the invention with respect to coatability are illustrated by Run ## 11 and 12. In addition to coatability, Run #11 is the preferred embodiment with respect to long term or aged slurry stability as determined by the fact that no bubbles were observed beyond 30 days at which pH was 6.35. For immediate stability as indicated by viscosity, pH and hydrogen evolution, Run #12, having a slightly reduced organic content (4% Triton ® X-100 versus 5% in Run #11) was determined to be the most preferred embodiment. Thus, the lower the organic content, the cheaper the slurry cost and the lower the gassing potential. However, the lower limit of organic content is governed by coatability and shelf life requirements, while the upper limit is governed by slurry stability, gassing and cost concerns.

All of the substrates coated with these slurries showed clean blow off, smooth film, good bonding of the coating to the substrate, and proper coating weight pickup. The results of Run ## 11 and 12 were duplicated in subsequent scale up experiments by increasing the sample size from 1500 to 7500 grams.

As illustrated by the above examples, the invention provides uniform, fluid slurries which are stable and easily coated or applied to substrates such as filters. Honeycomb substrates coated with these slurries yielded smooth, uniform coatings with good bond strength. No catastrophic failures were observed when molten steel was poured through the coated substrates. In addition, the molten metal pour operation required very low priming temperatures and no gassing problems were observed.

In addition to the embodiments discussed above, it should be understood that given the teachings herein, numerous alternatives and equivalents which do not depart from the present invention will be apparent to those skilled in the art, and are intended to be included within the scope of the present invention. It should also be understood that this invention is not to be unduly limited to the illustrative embodiments set forth herein.

I claim:

1. A molten metal filter having formed thereon, an aqueous thermite coating slurry, the slurry comprising oleic acid-pre-coated thermite solids and graphite powders, water, water-miscible surfactant, water-soluble dispersant to redisperse the acid coated powders, and water-soluble binder.

2. The molten metal filter of claim 1, wherein the oleic acid is present in an amount between 0.5 and 30% based on powders.

3. The molten metal filter of claim 1, wherein the water-miscible surfactant is an alkenylphenyl polyether alcohol having a calculated HLB value of at least 13.

4. The molten metal filter of claim 1, wherein the binder is a low molecular weight water-soluble binder selected from polyvinyl alcohol and polyvinylpyrrolidones, having molecular weight in the range of 20,000-80,000.

5. The molten metal filter of claim 4, wherein the low molecular weight water-soluble binder is polyvinyl alcohol having a molecular weight in the range of 31,000 to 50,000.

6. The molten metal filter of claim 1, wherein the dispersant is a salt of a polymeric carboxylic acid.

7. The molten metal filter of claim 1, wherein the thermite solids consist of metal and metal alloy powders.

8. The molten metal filter of claim 7, wherein the metal and metal alloy powders are coated with the oleic acid and redispersed in the slurry using the water-miscible surfactants and water-soluble dispersants.

9. A process for making molten metal filter comprising the steps of:
providing thermite solids comprising Cr/Al alloy, Fe/Al alloy, carbon, graphite, and $Fe_2O_3$;
first treating the alloy with oleic acid;
providing water-soluble binder;

adding water-miscible surfactant to the binder to form a surfactant/binder solution;

adding the oleic acid-treated alloy to the surfactant-/binder solution;

adding a water-soluble dispersant to the solution;

adding the remaining thermite solids to the solution to form an aqueous thermite slurry;

applying the aqueous thermite slurry onto a porous substrate; and bonding the slurry to the substrate to form a molten metal filter.

10. The process of claim 9, wherein the substrate is made of material selected from the group consisting of alumina, mullite, zircon, zirconia, spinel, cordierite, lithium, aluminosilicates, titania, feldspars, quartz, fused silica, silicon carbide, kaolin clay, aluminum titanate, silicates, and aluminates.

11. The process of claim 9, wherein the porous substrate is a honeycomb structure having a plurality of thin walls defining a plurality of open ended cells extending therethrough.

12. The process of claim 9, wherein the porous substrate is a ceramic foam material having an open cell structure characterized by a plurality of interconnected voids surrounded by a web of said ceramic.

13. The process of claim 9, wherein the slurry is applied to the substrate by a technique selected from the group consisting of dipping, immersion, spraying and pouring.

14. Aqueous thermite coating slurry for use in preparing a thermite coated molten metal filter, said slurry having the following composition: 40 to 50% thermite solids and graphite pre-coated with 0.5 to 30% oleic acid, 2 to 10% polyvinyl alcohol solution, 2 to 10% alkenylphenyl polyether alcohol, and 0.5 to 3% water soluble sodium salt of a polymeric carboxylic acid, wherein said thermite solids consist essentially of about, 35% alloy, 30% graphite, and 35% $Fe_2O_3$ powder.

15. The aqueous thermite coating slurry of claim 14, wherein the slurry comprises 47% thermite solids and graphite, 5% polyvinyl alcohol solution, 4-5% alkenylphenyl polyether alcohol, 3% oleic acid, and 1% water soluble sodium salt of a polymeric carboxylic acid, and wherein said thermite solids consist essentially of, 35.28% alloy, 30% graphite, and 34.72% $Fe_2O_3$ powder.

16. In a method of removing impurities from molten metal by passing the molten metal through a filter, the improvement being that the molten metal filter has formed thereon, an aqueous thermite coating slurry comprising oleic acid-pre-coated thermite solids, water-miscible surfactant, water-soluble dispersant, and water-soluble binder.

17. The method of claim 16, wherein the metal alloy powders are coated with the oleic acid and dispersed in an aqueous medium.

18. The method of claim 16, wherein the honeycomb filter is selected from the group consisting of alumina, mullite, zircon, zirconia, spinel, cordierite, lithium, aluminosilicates, titania, feldspars, quartz, fused silica, silicon carbide, kaolin clay, aluminum titanate, silicates, and aluminates.

* * * * *